(12) United States Patent
Lin

(10) Patent No.: US 9,275,434 B2
(45) Date of Patent: Mar. 1, 2016

(54) PHASE CONTROL MULTI-TAP DOWNSCALE FILTER

(71) Applicant: QUALCOMM Incorporated, San Diego, CA (US)

(72) Inventor: Shu Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 14/204,767

(22) Filed: Mar. 11, 2014

(65) Prior Publication Data

US 2015/0262328 A1    Sep. 17, 2015

(51) Int. Cl.
*H04N 7/01*    (2006.01)
*G06T 3/40*    (2006.01)

(52) U.S. Cl.
CPC ............... *G06T 3/40* (2013.01); *G06T 3/4007* (2013.01); *H04N 7/0122* (2013.01); *G09G 2340/0407* (2013.01); *G09G 2340/0442* (2013.01)

(58) Field of Classification Search
CPC ...... H04N 7/0122; H04N 5/2628; G06T 3/40; G09G 2340/0442; G09G 2340/0407
USPC ........................................................ 348/581
See application file for complete search history.

(56) References Cited

U.S. PATENT DOCUMENTS

| | | | |
|---|---|---|---|
| 6,903,733 B1 * | 6/2005 | Greenberg et al. | 345/204 |
| 6,937,291 B1 | 8/2005 | Gryskiewicz | |
| 6,983,019 B2 | 1/2006 | Yiwen et al. | |
| 7,098,930 B2 | 8/2006 | MacInnis et al. | |
| 7,375,767 B2 | 5/2008 | Lee et al. | |
| 7,619,639 B1 * | 11/2009 | Azar et al. | 345/667 |
| 8,107,571 B2 | 1/2012 | Sullivan et al. | |
| 2002/0118219 A1 | 8/2002 | Nally et al. | |
| 2006/0077213 A1 * | 4/2006 | Li | 345/660 |
| 2008/0198264 A1 | 8/2008 | Balram | |

OTHER PUBLICATIONS

International Search Report and Written Opinion—PCT/US2015/019425—ISA/EPO—Aug. 7, 2015.

* cited by examiner

*Primary Examiner* — Michael Lee
(74) *Attorney, Agent, or Firm* — Knobbe, Martens, Olson & Bear, LLP

(57) ABSTRACT

Implementations include video image processing systems, methods, and apparatus for downscaling video data using a phase control multi-tap downscale filter. For example, a device configured to process video information may include a memory configured to store a downscaling filter comprising a number of coefficients. A processor may be configured to receive video input data and determine a scale factor between the video input data and a video output. In addition, the processor may be configured to modify the downscaling filter based on the scale factor and the number of coefficients in the unmodified downscaling filter. The processor may be configured to downscale the video input data using the modified downscaling filter.

30 Claims, 8 Drawing Sheets

PHASE CONTROL MULTI-TAP DOWNSCALE FILTER

BACKGROUND

1. Field of the Invention

The present implementations relate to image processing, and in particular, to video image processing systems, methods, and apparatus for downscaling video data using a phase control multi-tap downscale filter.

2. Description of the Related Art

A wide range of electronic devices, including mobile wireless communication devices, personal digital assistants (PDAs), laptop computers, desktop computers, digital cameras, digital recording devices, and the like, have an assortment of image and video display capabilities. Some devices are capable of displaying two-dimensional (2D) images and video, three-dimensional (3D) images and video, or both.

Video data may be provided in varying formats. The formats may vary in the resolution of the video data provided. For example, some formats may provide high definition video data (e.g., 1920 by 1080) while other formats may provide lower resolution video data (e.g., 864 by 480).

A display device may be configured to present video data at a limited resolution. For example, a mobile device may be configured to display video data at a resolution of 864 by 480. The display device may be configured for a resolution based on the size of the available display and/or the resources available to the display device such as processor resources, power resources, bandwidth resources, and the like. Notwithstanding the particular configuration of each display device, the display device may receive video data at a higher resolution than the device may be configured to display. The process of converting the higher resolution video data into a lower resolution may generally be referred to as downscaling.

Downscaling may be performed on an encoding device or a decoding device. When implemented in an encoding device, the device receives the source video data and encodes a downscaled version of the video data for transmission to a display device. When implemented in a decoding device, the device may receive the reference video data, decode the reference video data, and generate a lower resolution version of the reference video data. In some implementations, the decoding device is included in the display device. In some implementations, the decoding device may be coupled with the display device.

As the process of downscaling also utilizes device resources, efficient systems and methods for performing downscaling may be desirable.

SUMMARY OF THE DISCLOSURE

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to provide integrated downscaling in a video core.

In accordance with some embodiments, a device for processing video information includes a processor and a memory. The memory can be configured to store a downscaling filter comprising a number of coefficients. The processor can be configured to: receive video input data; determine a scale factor between the video input data and a video output; modify the downscaling filter based on the scale factor and the number of coefficients in the unmodified downscaling filter; and downscale the video input data using the modified downscaling filter.

In accordance with some embodiments, a method of processing video information can include: receiving a downscaling filter comprising a number of coefficients; receiving video input data; determining a scale factor between the video input data and a video output; modifying the downscaling filter based on the scale factor and the number of coefficients in the unmodified downscaling filter; and downscale the video input data using the modified downscaling filter.

In accordance with some embodiments, an apparatus for processing video information can include means for receiving a downscaling filter comprising a number of coefficients; means for receiving video input data; means for determining a scale factor between the video input data and a video output; means for modifying the downscaling filter based on the scale factor and the number of coefficients in the unmodified downscaling filter; and means for downscaling the video input data using the modified downscaling filter.

In accordance with some embodiments, an non-transitory computer-readable medium can have stored thereon instructions that, when executed by a processor, cause the processor to: receive a downscaling filter comprising a number of coefficients; receive video input data; determine a scale factor between the video input data and a video output; modify the downscaling filter based on the scale factor and the number of coefficients in the unmodified downscaling filter; and downscale the video input data using the modified downscaling filter.

BRIEF DESCRIPTION OF DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
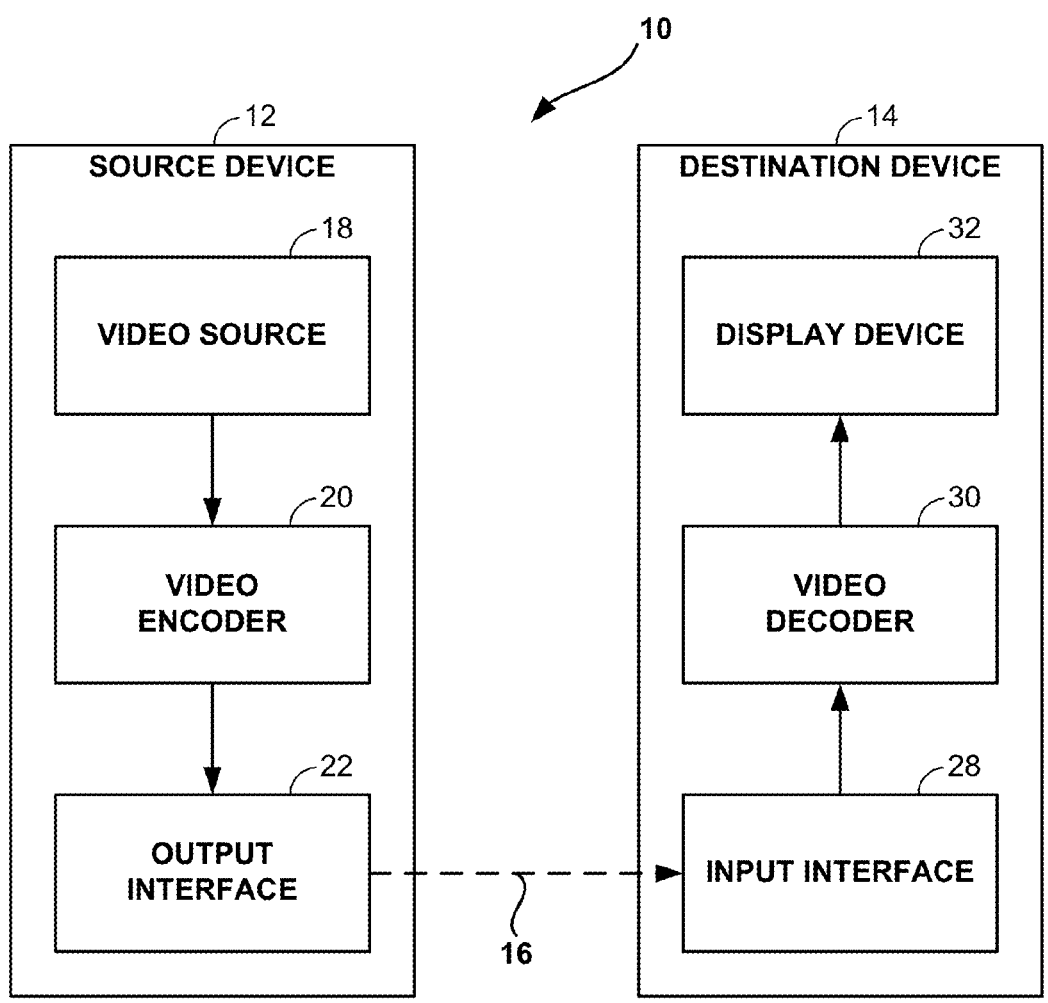
FIG. 1 shows a functional block diagram of an exemplary video encoding and decoding system.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

A downscaler may downscale video input data using a downscaling filter and write a display frame to an external memory. The frame may have the same resolution as a target display device (e.g., mobile device, cellphone). The target display device may then read the display frame, rather than the original higher resolution frame. Depending in part on the resolution of the target display device, the coefficients of the downscaling filter may need to be modified. Rather than store different downscaling filters in memory for each combination between resolution of video input data and resolution of the target display device, modified coefficients of the downscaling filter may be determined.

The process may include receiving a downscaling filter comprising a number of coefficients and receiving video input data. The process may further include determining a scale factor between the video input data and a video output (e.g., a target display device). The process may further include modifying the downscaling filter based on the scale factor and the number of coefficients in the unmodified downscaling filter. The process may further include downscaling the video input data using the modified downscaling filter. If implemented as a decoder, the downscaled video data may be displayed. If implemented as an encoder, the downscaled video data may be fed into the encoder and/or transmitted to a target display device.

By modifying the downscaling filter using the techniques described herein, a beneficial tradeoff between picture quality and ease of implementation may be obtained. In addition, by modifying the downscaling filter using the techniques described herein, during encoding/decoding, resources such as memory bandwidth, memory access, and bus bandwidth can be conserved. In addition to providing a savings in resources, the integrated approach may also reduce the time to generate the downscaled image. These and further benefits will manifest themselves through further explanation of the aspects related to the integrated downscaling.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. Destination device 14 may access the encoded video data through a standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM).

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats such as VP8 and related formats.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned briefly above, video encoder 20 encodes video data. The video encoder 20 may be configured to generate a downscaled version of the reference image. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g. encode) the treeblocks in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g. the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video coder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include various syntax structures.

The video decoder 30 may receive the downscaled frames of the reference image. The video decoder 30 may also be configured for downscaling. The video decoder 30 may generate the downscaled version of the reference image based on the sequence of frames of the reference image. The video decoder 30 may generate the downscaled frame based on the target display for the video.

In addition, video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

A video sequence typically includes a series of video frames. Video encoder 20 and video decoder 30 may operate on video blocks within individual video frames in order to encode and decode the video data. The video blocks may have fixed or varying sizes, and may differ in size according to a specified coding standard. Each video frame may include a series of slices or other independently decodable units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units. In this disclosure, the term "coded unit" refers to any independently decodable unit of a video frame such as an entire frame, a slice of a frame, a group of pictures (GOPs), or another independently decodable unit defined according to the coding techniques used.

For ease of description, reference will be made to frames, blocks, macroblocks, and the like. However, it will be understood that other methods of representing video may be used consistent with the described downscaling processes described. For example, the video data may be represented using coding units and/or additional logical and/or physical organizational structure(s).

Figure 2:
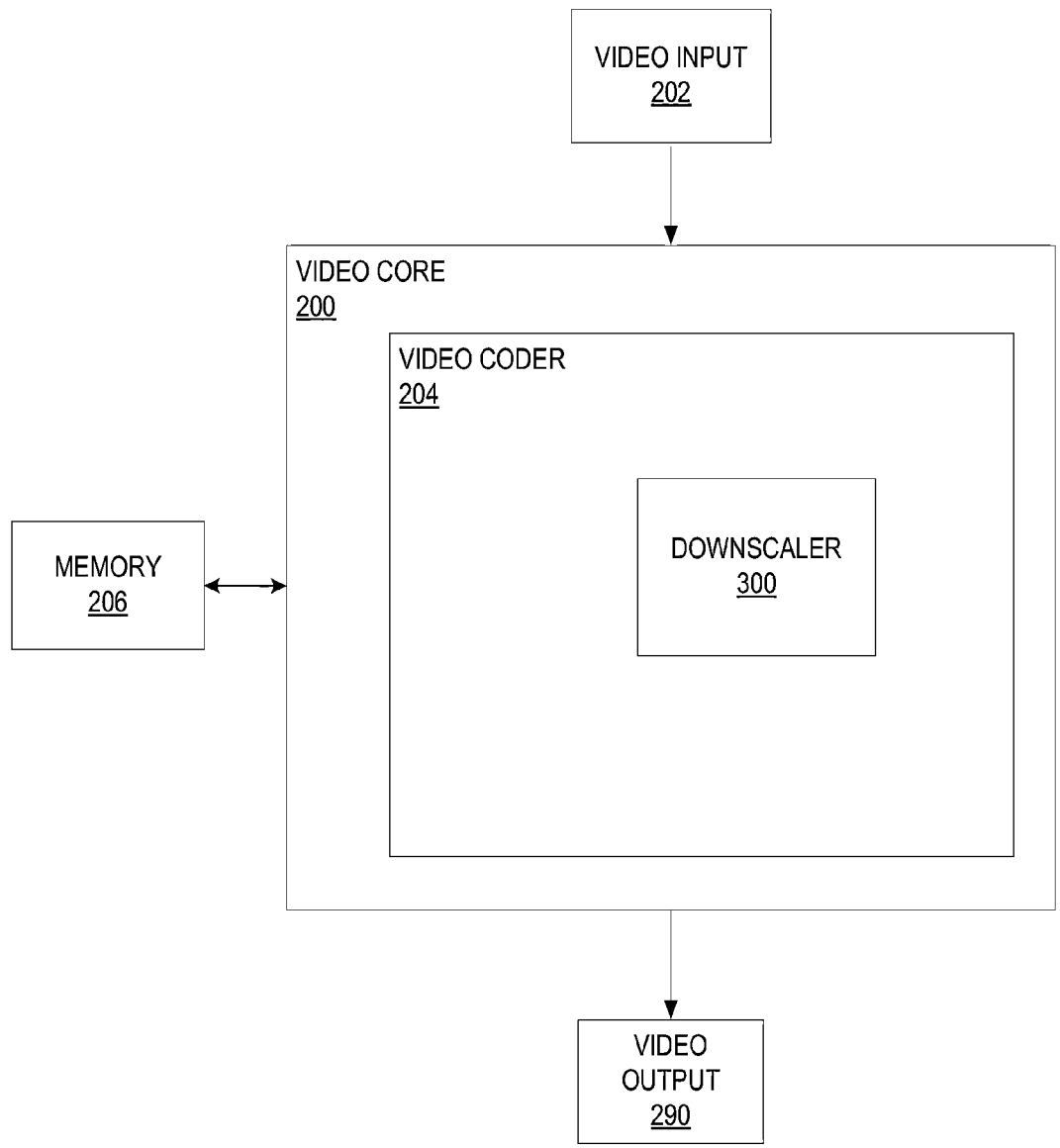
FIG. 2 shows a functional block diagram of an exemplary video core including a downscaler.

FIG. 2 shows a functional block diagram of an exemplary video core including a downscaler. The video core 200 may be an electronic device which receives a video input 202 and generates a video output 290. The video core 200 may include a video coder 204. The video coder 204 may be configured to perform encoding and/or decoding of the input video 202. The configuration may be stored in memory 206 and read by the video coder 204. For example, the video coder 204 may be configured to encode and decode video in a certain format, at certain bit rate, at a specified resolution, and the like. Each time the video coder 204 processes video, the configuration information may be read to establish the processing to be performed by the video coder 204. While the memory 206 is shown as an element outside the video core 200, in some implementations, the memory 206 may be integrated with the video core 200 and/or the video coder 204. Furthermore, the memory 206 is shown as a single element, it may be desirable, in some implementations, to provide multiple memories to support the processing of the video core 200.

In some implementations, the video coder 204 may be adaptively configured. For example, the input video 202 may be preprocessed to determine its type. In some implementations, the preprocessing may include determining characteristics of the device in which the video core 200 is included. Such characteristics may include the available power, available bandwidth, available processing resources, coupled devices (e.g., displays), available memory, and the like. In such a way, the video coder 204 may be adaptively configured in consideration of its operational environment.

The video coder 204 may include a downscaler 300. The downscaler 300 will be described in further detail below (e.g., with respect to FIG. 3).

The video core 200 may include additional processing elements. For example, the video core 200 may include preprocessing elements configured to process the video input 202 before the video coder 204. One example of a pre-processing element is a decryption unit configured to decrypt an encrypted video input 202.

Similarly, the video core may include post-processing elements configured to process the video data generated by the video coder. One example of a post-processing element is an encryption unit configured to encrypt the video data prior to output.

Figure 3:
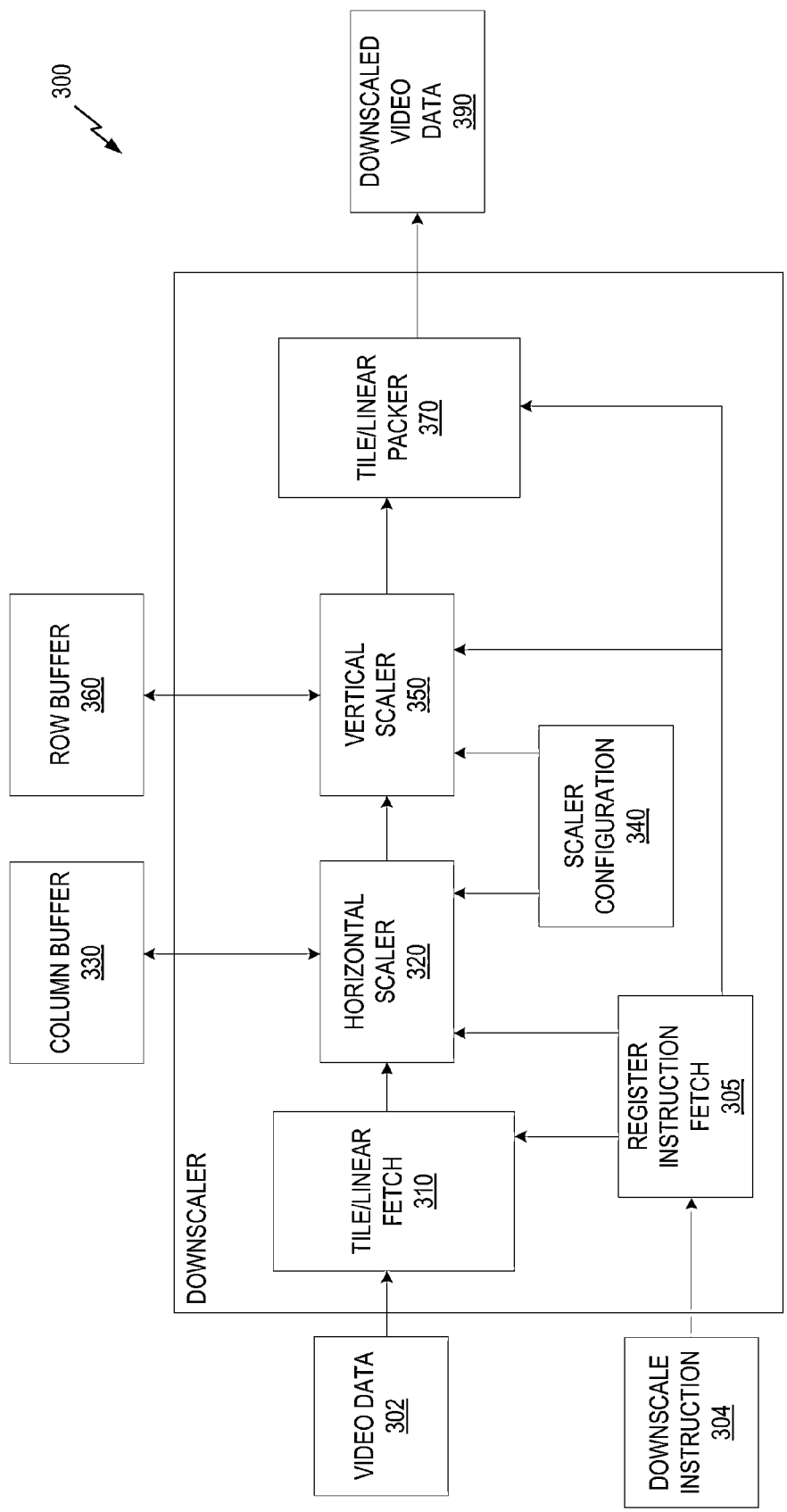
FIG. 3 shows a functional block diagram of an exemplary downscaler.

FIG. 3 shows a functional block diagram of an exemplary downscaler. One input the downscaler 300 may receive is video data 302. The video data 302 may be encoded video data or raw video data. For example, the downscaler 300 may be configured to downscale video data as part of the encoding process. In such implementations, the video data 302 may be raw. The downscaler 300 may be configured to downscale video data as part of the decoding process. In these implementations, the video data 302 may be encoded video data.

The downscaler 300 may also receive one or more downscale instructions 304. The downscale instructions 304 provide information to control the downscaling function. For example, if the downscaler is operating on interlaced video input, how portions of the video data 302 are retrieved for downscaling and stored after downscaling may be affected. The downscale instructions 304 may be stored in a register instruction fetch 305 included in the downscaler 300.

The downscale instructions 304 and the video data 302 may be provided to a tile/linear fetch 310 included in the downscaler 300. The tile/linear fetch 310 may be configured to obtain portions of the video data 302 stored in memory.

The obtained portions of video data may be provided to a horizontal scaler 320. The horizontal scaler 320 may also be configured to receive one or more downscale instructions 304 from the register instruction fetch 305. The horizontal scaler 320 may be further configured to receive scaler configuration values from a scaler configuration 340.

The scaler configuration 340 stores configurations used during the downscale process. For example, the scaler configuration 340 may include a lookup table. The lookup table may include scaling values for horizontal and or vertical downscaling. The scaling values may be represented, for example, as a percentage, a ratio, or a function. The scaler configuration 340 may store the configurations in a static memory storage. In some implementations the scaler configuration 340 may be updated such as via signaling from a device coupled with the downscaler 300 or an application which may use the downscaler 300. In one implementation, the scaler configuration 340 may include 58 entries each entry corresponding to a downscaling ratio, such as a scale factor.

The horizontal scaler 320 may also be configured to read and or write scaled horizontal video data from/to a column buffer 330. The column buffer 330 is shown outside the downscaler 300. In some implementations, the column buffer 330 may be implemented as part of the downscaler 300. The column buffer 330 may be configured to accumulate downscaled values generated by the horizontal scaler 320. The column buffer 330 may store luminance, chrominance values, and/or control information, including accumulated phase values and accumulated pixel values for downscaling video. The size of the row and column buffers may depend on the video block size and the scaled block size. The column buffer 330 may also include the accumulated phase values for each color component. As one example, the column buffer 330 may include 64 entries, each entry 19 bits long for accumulated pixel value for 8-bit input pixel value, and 32 phases; and 64 entries each entry 21 bits long for accumulated phase values. This example may be suitable for storing accumulated luminance values. The column buffer 330 may also include 32 entries of 18 bits in length for storing each of accumulated chrominance blue and accumulated chrominance red values for YUV420 color format; and 32 entries of 21 bits in length for storing accumulated phases values for each chrominance In some implementations, the column buffer 330 may be implemented as a single buffer for storing accumulated chrominance and accumulated luminance values. In some implementations, separate column buffers may be included, one for storing luminance values and one for storing chrominance values.

The horizontally scaled video data may then be provided to a vertical scaler 350 included in the downscaler 300. The vertical scaler 350 may be configured to downscale the video data along the vertical direction. As with the horizontal scaler 320, the vertical scaler 350 may obtain instructions from the register instruction fetch 305 and scaler configuration values from the scaler configuration 340. The vertical scaler 350 may be configured to read and/or write values to a row buffer 360. The row buffer 360 may be configured to accumulate downscaled values generated by the vertical scaler 350. The row buffer 360 may store luminance and/or chrominance values for the downscaled video. As one example, the row buffer 360 may include 1920 entries, each entry 19 bits long for accumulated pixel values and 21 bits long for accumulated phase values. This example may be suitable for storing luminance values. The row buffer 360 may also include 2×960 entries, each 19 bits long for storing accumulated blue/red chrominance values, and 21 bits for accumulated phase values for YUV420 format. In some implementations, the row buffer 360 may be implemented as a single buffer for storing chrominance and luminance values. In some implementations, separate row buffers may be included, one for storing luminance values and one for storing chrominance values.

The downscaled video data may then be provided to a tile/linear packer 370. The tile/linear packer 370 may be configured to construct downscaled video data 390 based on the scaled rows and columns. The generation of the downscaled video data 390 by the tile/linear packer 370 may be based on the downscale instructions 304 obtained by the tile/linear packer 370 from the register instruction fetch 305. As one example, the tile/linear packer 370 may be configured to store the downscaled video data 390 in downscale RAM. The downscale RAM may be implemented as four RAM units, each RAM unit including 384 entries, each entry including 32 bits. The downscaled video data 390 may be provided (e.g., stored, transmitted, or otherwise made available) in other forms without departing from the scope of the disclosure.

In some implementations, the tile/linear packer 370 may also be configured to transmit a control signal. The control signal may be used for subsequent processing of the downscaled video data 390. For example, a write data mover included in an encoder or decoder may detect the control signal and continue encoding or decoding processes.

Figure 4:
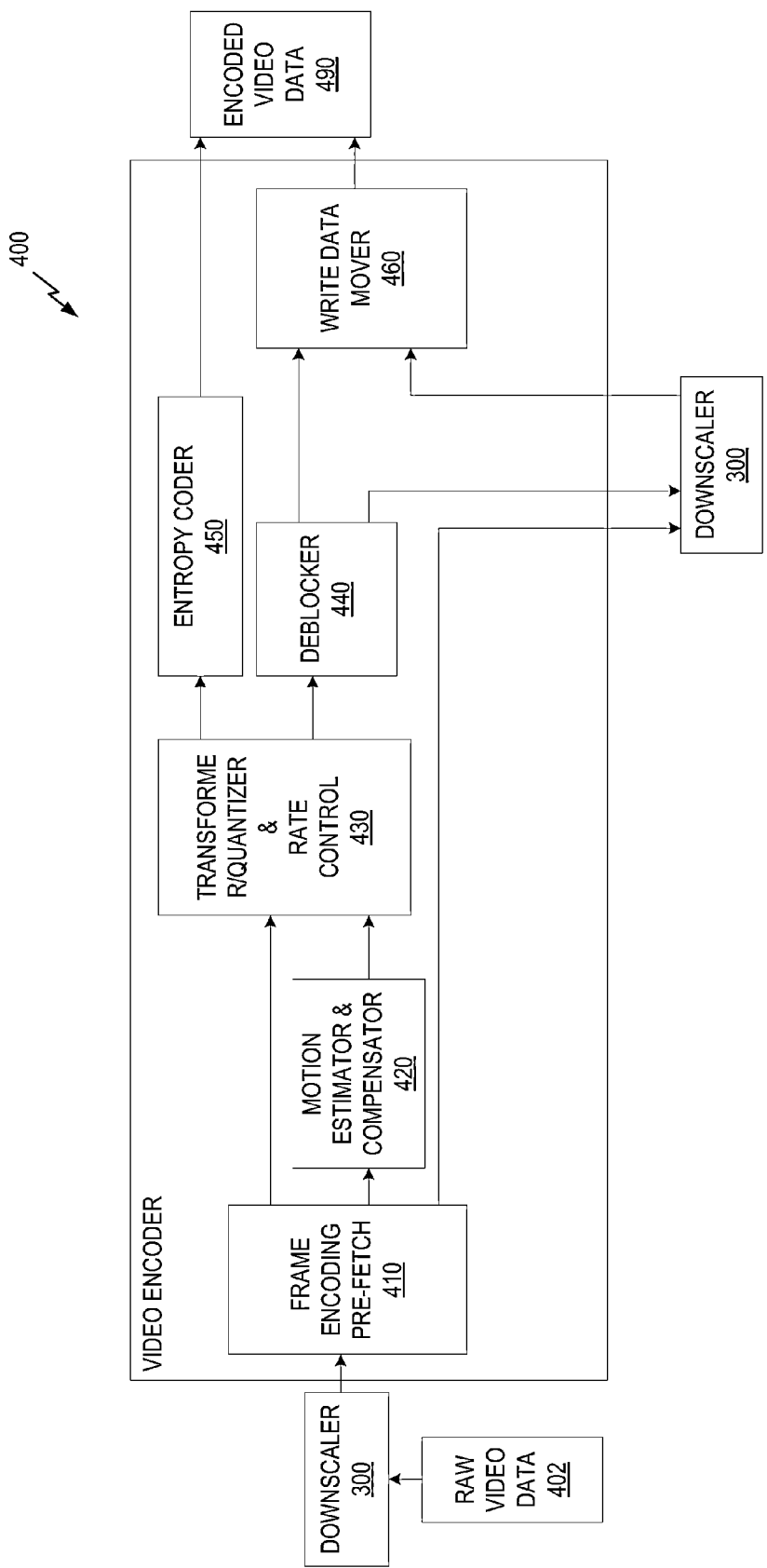
FIG. 4 shows a functional block diagram of an exemplary video encoder.

FIG. 4 shows a functional block diagram of an exemplary video encoder. The video encoder 400 receives as an input raw video data 402. The raw video data 402 may be received from a variety of sources such as a sensor (e.g., a camera), a memory, a network location, or the like.

In some embodiments, a downscaler 300 may be provided to receive the raw video data 402 before input to the video encoder 400. For example, the downscaler 300 may downscale the raw video data 402 and send the downscaled raw video data to the frame encoding prefetch 410 of the video encoder 400. In addition, in some embodiments, the downscaler 300 may be provided as a functional block within or external to the video encoder 400. For example, the downscaler 300 may receive input from the frame encoding prefetch 410 and deblocker 440 and provide downscaled video data to the write data mover 480, as described in more detail below. In some embodiments, both downscalers 300 may be provided. For example, a first downscaling processing may be performed on the raw video data prior to input to the video encoder 300, and a second downscaling process may be performed during the video encoding process. In other embodiments, only one of the downscalers 300 may be provided.

A frame encoding prefetch 410 may be included in the video encoder 400. The frame encoding prefetch 410 may be configured to portions of the raw video data 402 for the encoding process. For example, the frame encoding prefetch 410 may be configured to obtain a current frame of the raw video data 402 to be encoded. The frame encoding prefetch 410 may be configured to obtain a reference frame of the raw video data 402. The reference frame may be used to encode the current frame.

The reference frame may be provided to a motion estimator and compensator 420. The motion estimator and compensator 420 may be configured to generate a motion information for current frame. The motion estimator and compensator 420 may generate its values based on the current and reference frames obtained by the frame encoding prefetch 410. For example, the motion estimator and compensator 420 may generate generating motion vectors, which estimate motion for video blocks. A motion vector, for example, may indicate the displacement of a predictive block within a predictive input frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may include calculation of prediction data based on the predictive block. The information generated by the motion estimator and compensator 420 may be provided to a transformer/quantizer and rate control unit 430.

The transformer/quantizer and rate control unit 430 may also obtain the frames from the frame encoding prefetch 410. The transformer/quantizer and rate control unit 430 may be configured to allocate bit budgets over a certain period of time to achieve target bit rate for a certain visual quality. Generally, a constant bit rate is desired for consistent visual quality. A rate control algorithm may dynamically adjust encoding parameters, most notably the quantization parameter, for the current frame according to the bit budget and statistics of the current frame and along with the encoded input video data generate pixel information for the input video data.

The pixel information may be provided to and entropy coder 450 and a deblocker 440. The entropy coder 450 may be configured to further compress the video data generated by the encoding process. For example, the entropy coder 450 may be configured to apply a Huffman coding to compress the video data.

The deblocker 440 may be configured to further process the video data by identifying and removing blocking artifacts. The transformer/quantizer and rate control unit 430 may, as a result of compression for instance, introduce block artifacts to the video data. The deblocker 440 may be configured to smooth these blocking artifacts to improve the visual quality of the video data. For example, the deblocker may be configured to filter the transformed input video data to remove visual blocking artifacts. The deblocker 440 may be configured to provide the deblocked video data to a write data mover 460. The write data mover 460 shown is configured to store the encoded video data 490, such as in a memory location.

The deblocker 440 may also provide the deblocked video data to the downscaler 300. In this way, a downscaled version of the encoded raw video data 402 may be generated. The current and/or reference frames obtained by the frame encoding prefetch 410 may be provided to the downscaler 300. Thus, the downscaler 300 may generate the downscaled version based on one or both of the deblocked version of the raw video data and the original reference and/or current frame obtained by the frame encoding prefetch 410. The downscaler 300 may be configured to provide the downscaled version to the write data mover 460. The write data mover 460 may be further configured to store the downscaled version of the encoded video data 490.

The video encoder 400 shown in FIG. 4 generates entropy encoded version of the raw video data, a deblocked encoded version of the raw video data, and a downscaled deblocked encoded version of the raw video data. It will be understood that the write data mover 460 may be configured to selectively store one or both of the downscaled and non-downscaled deblocked encoded versions. For example, if the device which includes the video encoder 400 has limited resources (e.g., memory, power), it may be desirable to avoid storing the full deblocked encoded version and instead store only the downscaled version.

Figure 5:
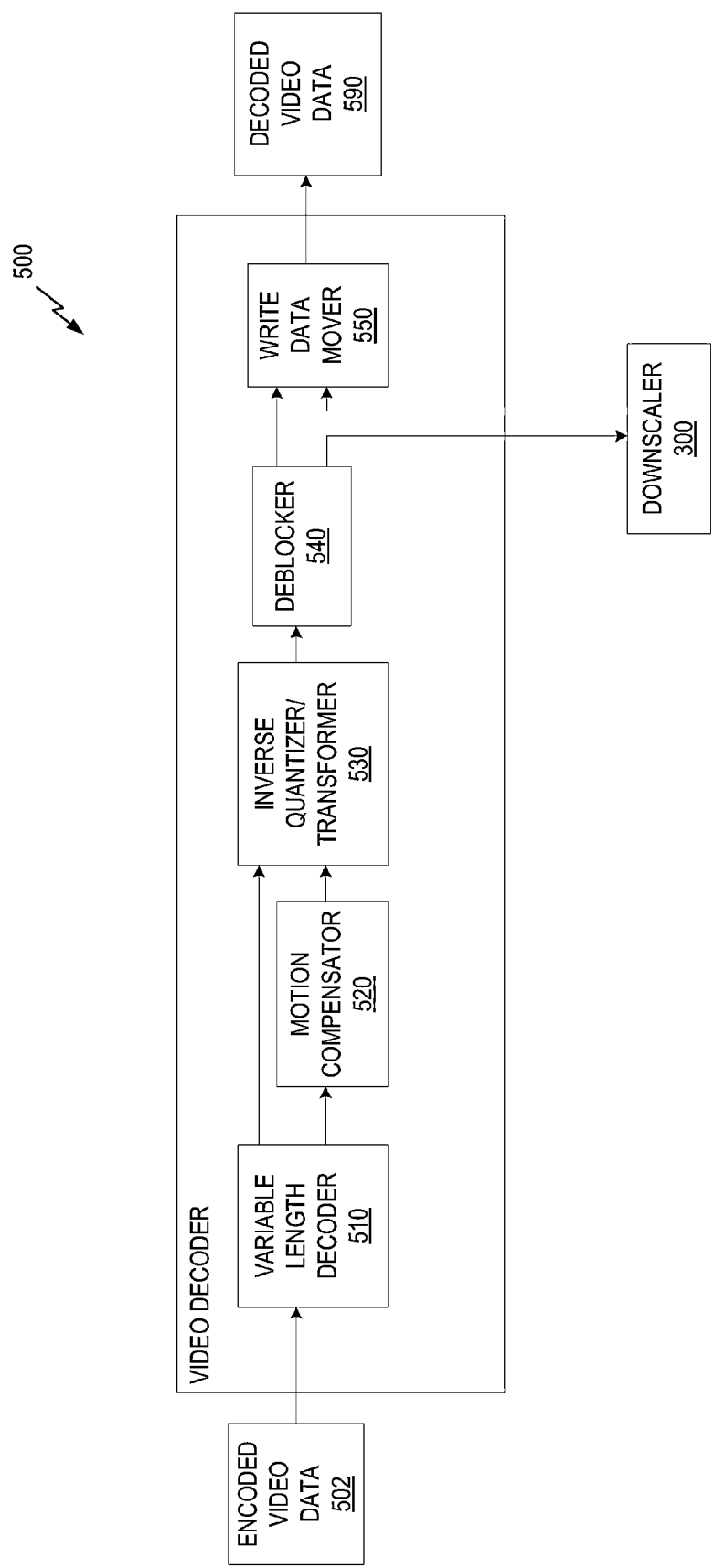
FIG. 5 shows a functional block diagram of an exemplary video decoder.

FIG. 5 shows a functional block diagram of an exemplary video decoder. The video decoder 500 may be configured to decode encoded video data 502. The encoded video data 502 may be received by a destination device 14 as described in FIG. 1.

The video decoder 500 shown includes a variable length decoder 510. The variable length decoder 510 may be configured to decompress the symbols included in the encoded video data 502. The decompressed information may be provided to a motion compensator 520. The motion compensator may be configured to reconstruct the input video data. The motion compensated video data and the variable length decoded video data may be provided to an inverse quantizer/transformer 530. The inverse quantizer/transformer 530 may be configured to further decompress the video data. Based on the motion compensated input video data and the decoded input video data, the inverse quantizer/transformer 530 may generate pixel values for the video data.

As discussed above with reference to FIG. 4, blocking artifacts may be introduced by, for example, the encoding and decoding processes. A deblocker 540 may be included in the video decoder 300 to remove such blocking artifacts. The deblocker 540 may be configured to provide the decoded and deblocked video data to a write data mover 550. The write data mover 550 may perform similar functions to the write data mover 460 included in the video encoder 400. For instance, the write data mover 550 may be configured to provide the decoded video data 590. Providing the decoded video data 590 may include storing the decoded video data 590 in a memory, transmitting the decoded video data 590 via a transceiver, or providing the decoded video data 590 for display. The deblocker 540 may also provide the deblocked decoded video data to the downscaler 300. The downscaler 300 may generate a downscaled version of the decoded and deblocked video data. The downscaled version may be provided to the write data mover 550 and processed as described above.

Figure 6:
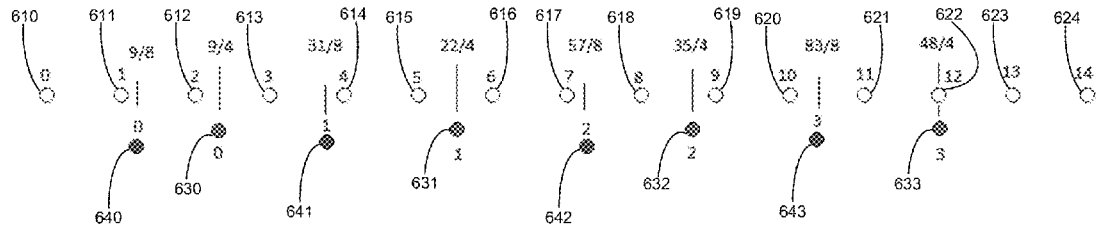
FIG. 6 illustrates an example of pixel alignment between an input video and a downscaled output video at a particular scale factor.

FIG. 6 illustrates an example of pixel alignment between an input video and a downscaled output video at a particular scale factor. In particular, FIG. 6 illustrates an example of pixel alignment between an input video and a downscaled output video at a scale factor of 13/4. For example, an input video can comprise a zero input pixel 610, a first input pixel 611, a second input pixel 612, a third input pixel 613, a fourth input pixel 614, a fifth input pixel 615, a sixth input pixel 616, a seventh input pixel 617, an eighth input pixel 618, a ninth input pixel 619, a tenth input pixel 620, an eleventh input pixel 621, a twelfth input pixel 622, a thirteenth input pixel 623, and a fourteenth input pixel 624. An output video can comprise a zero output pixel 630, a first output pixel 631, a second output pixel 632, and a third output pixel 633. An output video can comprise a zero output pixel phase 640, a first output pixel phase 641, a second output pixel phase 642, and a third output pixel phase 643.

FIG. 6 illustrates as an example the output video downscaled at a scale factor of 13/4. The scale factor, sometimes referred to as the phase step, indicates how many output pixels there are for a certain number of input pixels. In general, the scale factor is provided by:

$$S=N/M, (\text{where } N>=M)$$

where S indicates the scale factor, N indicates a number of input pixels, and M indicates the number of output pixels corresponding to N input pixels. As shown in FIG. 6, the example scale factor is 13/4, which means that for every 13 input pixels, there are 4 output pixels. For example, for the thirteen input pixels corresponding to input pixels 610-622, there are four output pixels corresponding to 630-633.

In general, an output pixel position Pout relative to an input domain (e.g., the input domain corresponding to a measurement of a number of input pixels) may be provided by:

$$Pout(n)=S*(n+1)-1,$$

where n is the nth output pixel, n=0, 1, 2 . . . . In the example of FIG. 6, an output pixel position Pout relative to an input domain may be provided by:

$$Pout(n)=13/4*(n+1)-1,$$

For example, a position of the zero output pixel 630 in the input domain is provided by:

$$Pout(0)=13/4*(0+1)-1=9/4$$

In general, the output pixel phase is relative to the input in the input domain, as follows:

$$Phase(n)=S*n+S/2-1,$$

where n=1, 2, . . . . In the example of FIG. 6, the output pixel phase relative to the input domain is provided as follows:

$$Phase(n)=13/4*n+5/8,$$

where n=1, 2, . . . . For example, the first output pixel phase 641 in the input domain is provided as follows:

$$Phase(1)=13/4*1+5/8=31/8$$

Also, the output pixel phase may also be measured in the output domain (e.g., the output domain corresponding to a measurement of a number of output pixels). In general, the output phase relative to input in the output domain may be provided as follows:

$$Phase(n)=n+1/2-1/S,$$

where n=1, 2, . . . . In the example of FIG. 6, the output pixel phase relative to the output domain may be provided as follows:

$$Phase(n)=n+5/26,$$

where n=1, 2, . . . . For example, the first output pixel phase 641 in the output domain is provided as follows:

$$Phase(1)=1+5/26=31/26$$

In general, a phase control M/N (PCMN) downscaler may downscale an input video by taking the average of the input pixel values over the output pixel period. For example, a PCMN downscale may determine output pixel values as follows:

$$P(n)=Sum(Pin(x)*D(x))/S,$$

where D(x) is the interval with pixel value of Pin(x), and x is [nS-1, (n+1)S-1]. An advantage of a PCMN downscaler is that it may be implemented with fewer computational resources. However, a drawback of a PCMN downscaler is that the downscaled picture may be soft, and details that may be desirable to preserve may be filtered.

Another approach to downscaling is to use a polyphase filter. For example, a polyphase downscaler may do image downscaling by using an M-tap, N-phase downscaling filter. For a polyphase downscaler, a low pass filter, or anti-aliasing filter, is designed for each down scale factor, or a range of factors. The filter coefficients may be reorganized for each phase. The total number coefficients may be N×M.

Table 1 below shows an example of a 4-tap, 32-phase polyphase filter that is designed to have a scale factor of 3/2:

TABLE 1

| | | | |
|---|---|---|---|
| 29, | 140, | 206, | 136, |
| 32, | 142, | 205, | 132, |
| 33, | 146, | 204, | 128, |
| 36, | 148, | 204, | 123, |
| 39, | 152, | 201, | 119, |
| 41, | 155, | 200, | 115, |
| 44, | 157, | 199, | 111, |
| 47, | 160, | 197, | 107, |
| 50, | 162, | 196, | 103, |
| 54, | 165, | 194, | 98, |
| 57, | 168, | 191, | 95, |
| 59, | 170, | 191, | 91, |
| 62, | 173, | 189, | 87, |
| 66, | 176, | 185, | 84, |
| 69, | 178, | 184, | 80, |
| 73, | 180, | 182, | 76, |
| 76, | 182, | 180, | 73, |
| 80, | 184, | 178, | 69, |
| 84, | 185, | 176, | 66, |
| 87, | 189, | 173, | 62, |
| 91, | 191, | 170, | 59, |
| 95, | 191, | 168, | 57, |
| 98, | 194, | 165, | 54, |
| 103, | 196, | 162, | 50, |
| 107, | 197, | 160, | 47, |
| 111, | 199, | 157, | 44, |
| 115, | 200, | 155, | 41, |
| 119, | 201, | 152, | 39, |
| 123, | 204, | 148, | 36, |
| 128, | 204, | 146, | 33, |
| 132, | 205, | 142, | 32, |
| 136, | 206, | 140, | 29 |

An advantage of using a polyphase filter to downscale is that it can provide good picture quality for down scaled images. For example, it can remove most high frequency signals beyond the Nyquist frequency if designed correctly. A drawback to polyphase filters is that if the down scaling supports a large scaling range, then, if techniques of this disclosure are not implemented, multiple sets of polyphase filters need to be designed, and a filter is loaded dynamically for each down scale factor during execution. In addition, the number of taps and the number of phases need to be traded off to avoid too many filter coefficients.

Table 2 below illustrates examples of scale ratios, in both the horizontal and vertical directions, between the HD 1080 display standard as the input video data and other common display resolutions as the output video data. As shown, converting from a single format of input video, such as HD 1080, to a range of formats for output video requires the ability to downscale at a large number of different scale ratios.

TABLE 2

| Display Standard | Display Width | Display Height | Scale ratio (x-dir) | Scale ratio (y-dir) |
|---|---|---|---|---|
| WUXGA | 1920 | 1200 | 1.00 | 1.11 |
| HD 1080 | 1920 | 1080 | 1.00 | 1.00 |
| WSXGA+ | 1600 | 1200 | 0.83 | 1.11 |
| UGA | 1680 | 1050 | 0.88 | 0.97 |
| SXGA+ | 1400 | 1050 | 0.73 | 0.97 |
| SXGA | 1280 | 1024 | 0.67 | 0.95 |
| WXGA | 1280 | 800 | 0.67 | 0.74 |
| HD 720 | 1280 | 720 | 0.67 | 0.67 |
| XGA | 1024 | 768 | 0.53 | 0.71 |
| WSVGA | 1024 | 600 | 0.53 | 0.56 |
| WVGA | 864 | 480 | 0.45 | 0.44 |
| VGA | 640 | 240 | 0.33 | 0.22 |
| QVGA | 320 | 240 | 0.17 | 0.22 |

Downscaling from other formats of input video to a range of formats for output video would quickly increase the number of different scale ratios needed to be supported. Accordingly, it is desirable to design a downscaler that has a quality as good or nearly as good as a polyphase downscaler, which also has a greater ease of implementation, including the ability to adapt to different scale ratios.

Figure 7A:
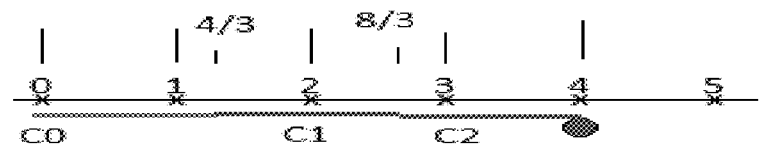
FIG. 7A shows an example schematic illustrating an embodiment of how a downscaling filter may be modified based on the number of downscaling filter coefficients and a scale factor between input video and downscaled output video.

FIG. 7A shows an example schematic illustrating an embodiment of how a downscaling filter may be modified based on the number of downscaling filter coefficients and a scale factor between input video and downscaled output video. For example, FIG. 7A shows an example schematic illustrating an embodiment of how a downscaling filter may be modified using a phase control multi-tap downscale (PC-MTDS) filter. In particular, a memory may be configured to store a downscaling filter comprising a number of coefficients. In the example illustrated in FIG. 7A, the unmodified downscaling filter is a 3-tap filter that includes three coefficients $\{C0, C1, C2\}$. In general, the downscaling filter may be a FIR filter with K taps. The downscaling filter does not necessarily need to be complex, as it will be modified in the PCMTDS process.

Next, a scale factor between the video input data and a video output is determined. In the example illustrated in FIG. 7A, the scale factor N/M is 4. The scale factor may be divided by the number of coefficients K in the unmodified filter to determine a sub phase step, as follows:

$$\frac{\frac{N}{M}}{K}$$

For example, as shown in FIG. 7A, when a downscaling filter includes 3 coefficients, and the scale ratio N/M is 4, then a sub phase step would be determined to be 4/3. When the coefficients are plotted along an axis by sub phase step relative to scale factor, in this example, a first coefficient C0 may correspond from 0 to 4/3, a second coefficient C1 may correspond from 4/3 to 8/3, and a third coefficient C2 may correspond from 8/3 to 4.

The downscaling filter may be modified based on the scale factor and the number of coefficients in the unmodified downscaling filter. For example, modified coefficients C0', C1', C2', and C3' for a modified downscaling filter may be determined based on the scale factor, the number of coefficients in the unmodified downscaling filter, and the coefficients themselves of the unmodified downscaling filter. The modified coefficient C0' may correspond to the interval between 0 and 1. The modified coefficient C1' may correspond to the interval between 1 and 2. The modified coefficient CT may correspond to the interval between 2 and 3. The modified coefficient C3' may correspond to the interval between 3 and 4.

In one embodiment, the modified coefficients C0', C1', C2', and C3' may be determined by weighting the unmodified coefficients according to the linear density of the unmodified coefficients in each interval corresponding to the modified coefficients. For example, the modified coefficient C0' may correspond to the interval between 0 and 1. As shown in FIG. 7A, only unmodified coefficient C0 is present in this interval, so modified coefficient C0' is simply the same as unmodified coefficient C0.

The modified coefficient C1' may correspond to the interval between 1 and 2. When the sub phase step of each unmodified coefficient is plotted relative to the scale factor, the interval between 1 and 2 corresponds to ⅓ of unmodified coefficient C0 (e.g., between 1 and 4/3) and ⅔ of unmodified coefficient C1 (e.g., between 4/3 and 2). Thus, in this example, the modified coefficient C1' may be determined as (C0+2*C1)/3.

The modified coefficient C2' may correspond to the interval between 2 and 3. When the sub phase step of each unmodified coefficient is plotted relative to the scale factor, the interval between 2 and 3 corresponds to ⅔ of unmodified coefficient C1 (e.g., between 2 and 8/3) and ⅓ of unmodified coefficient C2 (e.g., between 8/3 and 3). Thus, in this example, the modified coefficient C2' may be determined as (2*C1+C2)/3.

The modified coefficient C3' may correspond to the interval between 3 and 4. When the sub phase step of each unmodified coefficient is plotted relative to the scale factor, the interval between 3 and 4 corresponds only to unmodified coefficient C2. Thus, in this example, the modified coefficient C3' is simply the same as unmodified coefficient C2.

In summary, in the example of FIG. 7A, based on an unmodified downsampling filter having 3 coefficients, and based on a scale factor of 4, a modified downsampling filter may have 4 coefficients as {C0, (C0+2*C1)/3, (2*C1+C2)/3, C2}. In particular, if K=3, and the unmodified downsampling filter is {¼, ¾, 1/4}, based on a scale factor of 4, the modified downsampling filter may be {¼, 5/12, 5/12, ¼}. Normalizing, such that the sum of each coefficient in the filter is 1, the modified downsampling filter may be {3, 5, 5, 3}/16. As shown, in this example, the number of coefficients in the modified downscaling filter may be greater than the number of coefficients in the unmodified, or reference, downscaling filter. In general, the number of coefficients in the modified downscaling filter may increase as the scale factor increases.

Figure 7B:
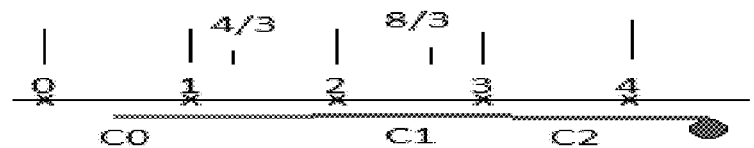
FIG. 7B shows an example schematic illustrating an embodiment of how a downscaling filter may be modified based on the number of downscaling filter coefficients, a scale factor between input video and downscaled output video, and a phase displacement between the input video and downscaled output video.

FIG. 7B shows an example schematic illustrating an embodiment of how a downscaling filter may be modified based on the number of downscaling filter coefficients, a scale factor between input video and downscaled output video, and a phase displacement between the input video and downscaled output video. For example, FIG. 7B shows an example schematic illustrating an embodiment of how a downscaling filter may be modified using a phase control multi-tap downscale (PCMTDS) filter when there is a phase displacement between the input video and downscaled output video. In particular, as described above with respect to FIG. 7A, a memory may be configured to store a downscaling filter comprising a number of coefficients. The unmodified downscaling filter may be a 3-tap filter that includes three coefficients {C0, C1, C2}.

In the example illustrated in FIG. 7B, the scale factor N/M is again 4 for purposes of comparison. Thus, the sub phase step would again be determined to be 4/3. However, the techniques described may be used with any scale factor.

The example of FIG. 7B is different than the example of FIG. 7A in that the coefficient C0 is shifted in phase displacement by 0.5. However, the same process described above with respect to FIG. 7A for determining the modified filter coefficients may be used. In this case, the downscaling filter may be modified based on the scale factor, the number of coefficients in the unmodified downscaling filter, and the phase displacement of the downscaling filter. For example, modified coefficients C0', C1', C2', C3', and C4' for a modified downscaling filter may be determined based on the scale factor, the number of coefficients in the unmodified downscaling filter, the phase displacement of the downscaling filter, and the coefficients themselves of the unmodified downscaling filter. The modified coefficient C0' may correspond to the interval between 0 and 1. The modified coefficient C1' may correspond to the interval between 1 and 2. The modified coefficient C2' may correspond to the interval between 2 and 3. The modified coefficient C3' may correspond to the interval between 3 and 4. The modified coefficient C4' may correspond to the interval between 3 and 4.

As shown in FIG. 7B, the modified coefficient C0' may correspond to the interval between 0 and 1. Only unmodified coefficient C0 is present in this interval, but the interval from 0 to 1 only corresponds to half of the unmodified coefficient C0 (e.g., from 0.5 to 1), so modified coefficient C0' is equal to unmodified coefficient C0/2.

The modified coefficient C1' may correspond to the interval between 1 and 2. When the sub phase step of each unmodified coefficient is plotted relative to the scale factor, the interval between 1 and 2 corresponds to ⅚ of unmodified coefficient C0 (e.g., between 1 and 11/6) and ⅙ of unmodified coefficient C1 (e.g., between 11/6 and 2). Thus, in this example, the modified coefficient C1' may be determined as (5*C0+C1)/6.

The modified coefficient C2' may correspond to the interval between 2 and 3. When the sub phase step of each unmodified coefficient is plotted relative to the scale factor, the interval between 2 and 3 corresponds only to unmodified coefficient. Thus, in this example, the modified coefficient C2' is equal to unmodified coefficient C1.

The modified coefficient C3' may correspond to the interval between 3 and 4. When the sub phase step of each unmodified coefficient is plotted relative to the scale factor, the interval between 3 and 4 corresponds to ⅙ of unmodified coefficient C1 (e.g., between 3 and 19/6) and ⅚ of unmodified coefficient C2 (e.g., between 19/6 and 4). Thus, in this example, the modified coefficient C3' may be determined as (C1+5*C2)/6.

The modified coefficient C4' may correspond to the interval between 4 and 5. Only unmodified coefficient C2 is present in this interval, but the interval from 4 to 5 only corresponds to half of the unmodified coefficient C2 (e.g., from 4 to 4.5), so modified coefficient C4' is equal to unmodified coefficient C2/2.

In summary, in the example of FIG. 7B, based on an unmodified downsampling filter having 3 coefficients, a scale factor of 4, and a phase displacement of 0.5, a modified downsampling filter may have 5 coefficients as {C0/2, (5*C0+C1)/6, C1, (C1+5*C2)/6, C2/2}. In particular, if K=3, and the unmodified downsampling filter is {¼, ¾, ¼}, based on a scale factor of 4, the modified downsampling filter may be {⅛, 7/24, ¾, 7/24, ⅛}. Normalizing, such that the sum of each coefficient in the filter is 1, the modified downsampling filter may be {3, 7, 12, 7, 3}/32. As shown, in this example, the number of coefficients in the modified downscaling filter may be greater than the number of coefficients in the unmodified, or reference, downscaling filter. In general, the number of coefficients in the modified downscaling filter may increase as the scale factor increases.

Figure 8:
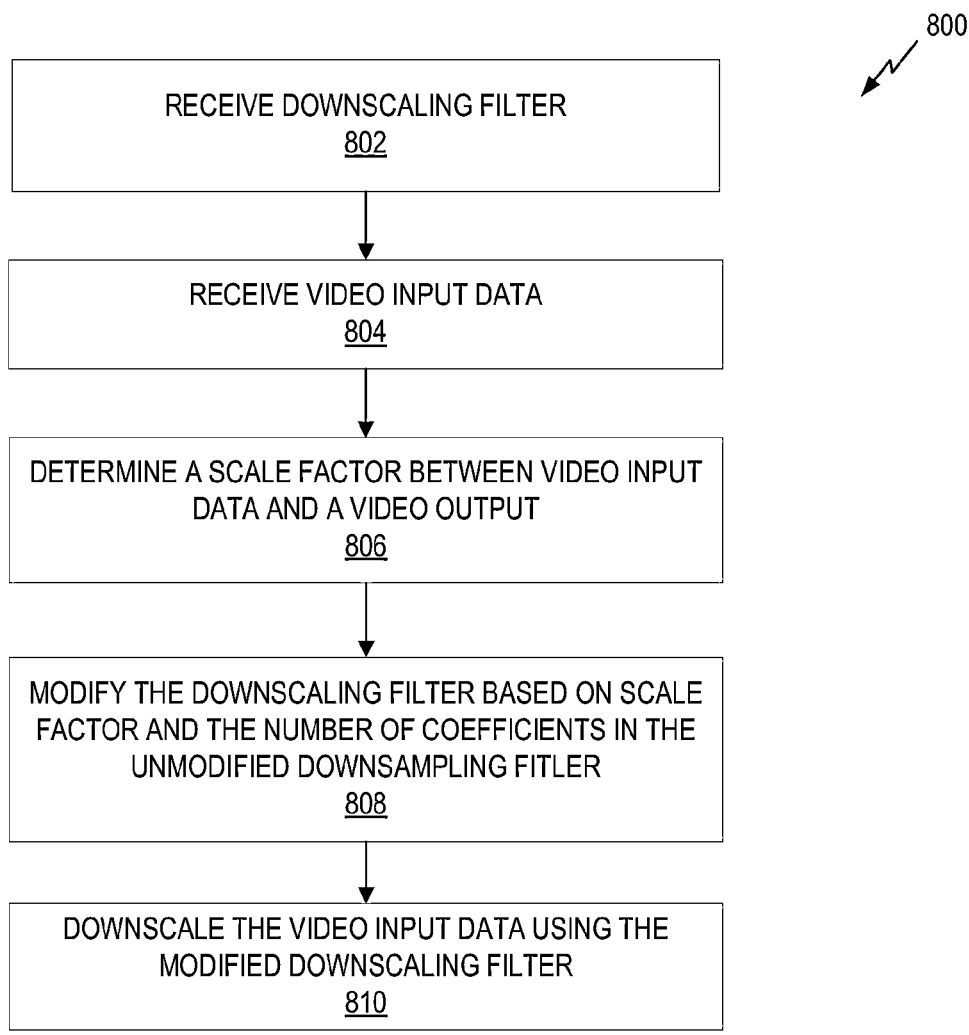
FIG. 8 shows a flowchart for an exemplary method of processing video data.

FIG. 8 shows a flowchart for an exemplary method of processing video data according to an embodiment. The method may be implemented in one or more of the devices described herein, such as the video core 200 and/or the downscaler 300.

At node 802, a downscaling filter is received. The downscaling filter may comprise a number of coefficients (e.g., K coefficients). The downscaling filter may be stored in a memory.

At node 804, video input data is received. The receiving may be wired or wireless reception. The receiving may include receiving the input video data from a sensor such as a camera and/or from a memory.

At node 806, a scale factor between the video input data and a video output is determined. For example, the video output may be based on an intended target device. The video input data may include a first resolution in a first direction, the video output may include a second resolution in the first direction, and the scale factor may include a ratio of the first resolution to the second resolution.

At node 808, the downscaling filter is modified based on the determined scale factor and the number of coefficients in the unmodified downsampling filter. For example, the downsampling filter may be modified as described above with respect to FIGS. 7A and 7B.

At node 810, the video input data is downscaled using the modified downscaling filter. As a result, output video data may be generated.

Figure 9:
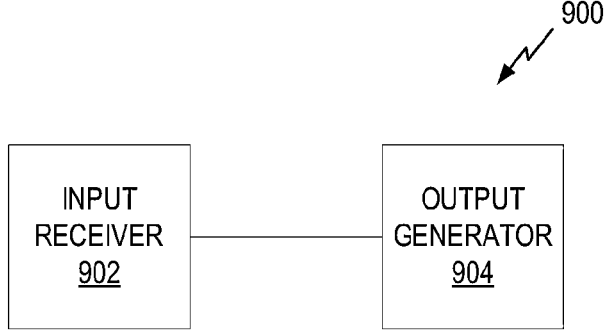
FIG. 9 shows a functional block diagram of an exemplary electronic device for processing video data.

FIG. 9 shows a functional block diagram of an exemplary electronic device for processing video data. Those skilled in the art will appreciate that an electronic device may have more components than the simplified video processing device 900 shown in FIG. 9. The video processing device 900 shows only those components useful for describing some prominent features of implementations within the scope of the claims. The video processing device 900 includes an input receiver 902 and an output generator 904.

The input receiver 902 is configured to receive input video data. The input receiver 902 may include one or more of an antenna, a signal processor, a network interface, a memory, and a peripheral interface. In some implementations, means for receiving input video data include the input receiver 902.

The output generator 904 is configured to generate output video data. Generating the output video data includes selectively encoding and decoding the input video data. A downscaled version of the input video data is generated during the encoding or decoding and the output video data includes the downscaled version of the input video data. The output generator 904 may be implemented using one or more of a video encoder, a video decoder, a downscaler, a motion compensation and estimation unit, a quantizer, a transformer, a rate control unit, a memory, a processor, a write data mover, a network interface, and a buffer. In some implementations, means for generating output video may include the output generator 904.

Figure 10:
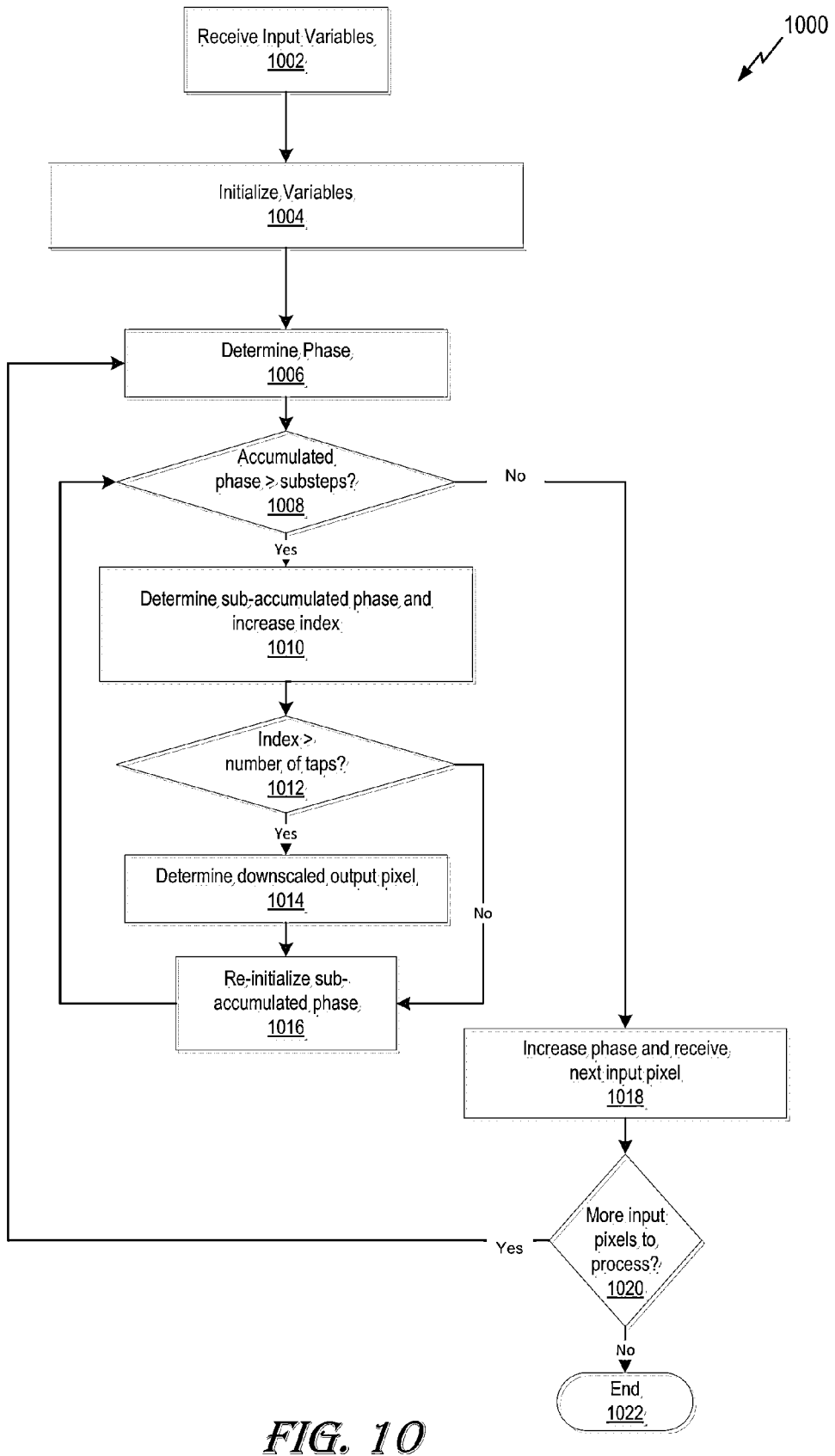
FIG. 10 shows a flowchart of an exemplary method of processing video data according to an embodiment.

FIG. 10 shows a flowchart for an exemplary method 1000 of processing video data according to an embodiment. The method may be implemented in one or more of the devices described herein, such as the video core 200 and/or the downscaler 300.

At node 1002, input variables may be received. For example, the input variables may comprise variables specifying an accumulated phase (e.g., accumulated_phase), a number of phase steps (e.g., phase_step), a number of taps in the stored downscaling filter (e.g., num_taps), and a number of input pixels in the received video data (e.g., input_num_pixels).

At node 1004, variables may be initialized. For example, variables Sub_step, Sub_idx, sub_accumulated_phase, Sub_steps[i], and Pix_num may be initialized and defined, as follows:

Sub_step = phase_step/num_taps
Sub_idx = accumulated_phase/Sub_step
sub_accumulated_phase = accumulated_phase-sub_idx*sub_step
Sub_steps[i] = i*sub_step, i=0,1,...,num_taps-1
Pix_num = 0

At node 1006, a phase may be determined. For example, a phase variable may be set equal to a one_pixel_phase variable, and the accumulated_phase variable may be increased by 1 pixel phase.

At node 1008, the accumulated phase may be compared to the sub_steps variable, as follows:

sub_accumulated_phase+phase>sub_steps[sub_idx]?
If greater, downscale processing may continue to block 1010. If not, the downscaling process is ready to proceed to block 1018 and receive the next input pixel.

At block 1010, sub_accumulated_phase may be determined. For example, sub_accumulated_phase may be determined, as follows:

diff_step = sub_steps[sub_idx]− sub_accumulated_phase
Sum = in_pixel*filt_coeff[sub_idx]*diff_step
sub_accumulated_phase = sub_accumulated_phase + diff_step
Accumulated_input = Accumulated_input + sum
Sub_idx = Sub_idx + 1
phase = phase − d_step In addition, the index Sub_idx may be increased by one.

At block 1012, the index may be compared with the number of taps, as follows: Sub_idx>=num_taps? If yes, the processing may continue to block 1014 to determine a downscaled output pixel. If not, the processing continues at block 1016.

At block 1014, a downscaled output pixel may be determined, and other variables re-initialized, as follows:

Pix_out = Accumulated_input/phase_step;
Accumulated_input=0
Sub_idx=0

At block 1016, variables may be reinitialized. For example, sub_accum_phase may be reinitialized to zero, as follows: sub_accum_phase=0. Processing may proceed back to block 1008.

At block 1018, if the result of block 1008 was negative, phase may be increased and the next input pixel received, as follows:

sub_accum_phase = sub_accum_phase + phase
sum = input_pixel*filt[sub_idx]*phase;
accumulated_input = accumulated_input + sum;
pix_num = pix_num + 1

At block 1020, it may be determined whether there are more pixels from the input video data to process, as follows: Pix_num<input_num_pixels?
If yes, processing may continue back to block 1006. If not, all input pixels have been downscaled, and processing may end at block 1022.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than or equal to a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

Moreover, the word "exemplary" is used herein to mean "serving as an example, instance, or illustration." Any embodiment described herein as "exemplary" is not necessarily to be construed as preferred or advantageous over other embodiments.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A device configured to process video information, the device comprising:
   a memory configured to store a downscaling filter comprising a first set of coefficients; and
   a processor in communication with the memory, the processor configured to:
   receive video input data;
   determine a scale factor between the video input data and a video output;
   determine a sub phase step based on the scale factor and a number of coefficients in the first set;
   determine a modified downscaling filter comprising a second set of coefficients based on the sub phase step and the first set of coefficients, wherein a number of coefficients in the second set is different from the number of coefficients in the first set; and
   downscale the video input data using the modified downscaling filter.

2. The device of claim 1, wherein the modified downscaling filter comprises a greater number of coefficients than the number of coefficients in the downscaling filter prior to the modification.

3. The device of claim 1, wherein the processor is further configured to determine the sub phase step based on a phase displacement of the video output with respect to the video input data.

4. The device of claim 1, wherein the video output is based on a resolution of a target display.

5. The device of claim 1, wherein:
   the video input data comprises a first resolution in a first direction;
   the video output comprises a second resolution in the first direction; and
   the scale factor comprises a ratio of the first resolution to the second resolution.

6. The device of claim 4, wherein the first direction comprises a horizontal direction.

7. The device of claim 4, wherein the first direction comprises a vertical direction.

8. The device of claim 1, wherein the scale factor comprises a horizontal scale factor in a horizontal direction and a vertical scale factor in a vertical direction, and the horizontal scale factor and vertical scale factor are different.

9. The device of claim 1, wherein the processor is further configured to downscale the video input data based on a deblocked encoded version of the received input video data.

10. The device of claim 1, wherein the processor is further configured to downscale the video input data based on a deblocked decoded version of the received input video data.

11. The device of claim 1, further comprising a transmitter configured to transmit the video output.

12. The device of claim 1, wherein the processor is further configured to determine the modified downscaling filter based on available bandwidth for transmitting data to a target display and resource availability for the device.

13. The device of claim 12, wherein the resource availability for the device comprises at least one of power, processing, memory, or bus availability.

14. A method of processing video information, the method comprising:
   receiving a downscaling filter comprising a first set of coefficients;
   receiving video input data;

determining a scale factor between the video input data and a video output;

determining a sub phase step based on the scale factor and a number of coefficients in the first set;

determining a modified downscaling filter comprising a second set of coefficients based on the sub phase step and the first set of coefficients, wherein a number of coefficients in the second set is different from the number of coefficients in the first set; and downscaling the video input data using the modified downscaling filter.

15. The method of claim 14, wherein the modified downscaling filter comprises a greater number of coefficients than the number of coefficients in the downscaling filter prior to the modification.

16. The method of claim 14, wherein the sub phase step is determined based on a phase displacement of the video output with respect to the video input data.

17. The method of claim 14, wherein the video output is based on a resolution of a target display.

18. The method of claim 14, wherein:
the video input data comprises a first resolution in a first direction;
the video output comprises a second resolution in the first direction; and
the scale factor comprises a ratio of the first resolution to the second resolution.

19. The method of claim 18, wherein the first direction comprises a horizontal direction.

20. The method of claim 18, wherein the first direction comprises a vertical direction.

21. The method of claim 14, wherein the scale factor comprises a horizontal scale factor in a horizontal direction and a vertical scale factor in a vertical direction, and the horizontal scale factor and vertical scale factor are different.

22. The method of claim 14, further comprising downscaling the video input data based on a deblocked encoded version of the received input video data.

23. The method of claim 14, further comprising downscaling the video input data based on a deblocked decoded version of the received input video data.

24. The method of claim 14, further comprising transmitting the video output.

25. The method of claim 14, further comprising modifying the downscaling filter based on available bandwidth for transmitting data to a target display and resource availability for the device.

26. The method of claim 25, wherein the resource availability for the device comprises at least one of power, processing, memory, or bus availability.

27. An apparatus for processing video information, the apparatus comprising:
means for receiving a downscaling filter comprising a number first set of coefficients;
means for receiving video input data;
means for determining a scale factor between the video input data and a video output;
means for determining a sub phase step based on the scale factor and a number of coefficients in the first set;
means for determining a modified downscaling filter comprising a second set of coefficients based on the sub phase step and the first set of coefficients, wherein a number of coefficients in the second set is different from the number of coefficients in the first set; and
means for downscaling the video input data using the modified downscaling filter.

28. The apparatus of claim 27, wherein:
the video input data comprises a first resolution in a first direction;
the video output comprises a second resolution in the first direction; and
the scale factor comprises a ratio of the first resolution to the second resolution.

29. A non-transitory computer-readable medium having stored thereon instructions that, when executed by a processor, cause the processor to:
receive a downscaling filter comprising a first set of coefficients;
receive video input data;
determine a scale factor between the video input data and a video output;
determine a sub phase step based on the scale factor and a number of coefficients in the first set;
determine a modified downscaling filter comprising a second set of coefficients based on the sub phase step and the first set of coefficients, wherein a number of coefficients in the second set is different from the number of coefficients in the first set; and
downscale the video input data using the modified downscaling filter.

30. The non-transitory computer-readable medium of claim 29, wherein:
the video input data comprises a first resolution in a first direction;
the video output comprises a second resolution in the first direction; and
the scale factor comprises a ratio of the first resolution to the second resolution.

\* \* \* \* \*